(12) United States Patent
Reischl

(10) Patent No.: US 9,745,141 B2
(45) Date of Patent: Aug. 29, 2017

(54) METHOD FOR ADDRESSING/SEQUENCING LINEARLY INTERLINKED CONTROL COMPONENTS OF A CONVEYING SYSTEM

(71) Applicant: TGW Mechanics GmbH, Wels (AT)

(72) Inventor: Josef Reischl, Gunskirchen (AT)

(73) Assignee: TGW Mechanics GmbH, Wels (AT)

( * ) Notice: Subject to any disclaimer, the term of this patent is extended or adjusted under 35 U.S.C. 154(b) by 0 days.

(21) Appl. No.: 15/034,569

(22) PCT Filed: Nov. 6, 2014

(86) PCT No.: PCT/AT2014/050265
§ 371 (c)(1),
(2) Date: Jul. 21, 2016

(87) PCT Pub. No.: WO2015/066745
PCT Pub. Date: May 14, 2015

(65) Prior Publication Data
US 2016/0318714 A1    Nov. 3, 2016

(30) Foreign Application Priority Data

Nov. 6, 2013  (AT) .............................. A 50737/2013

(51) Int. Cl.
*B65G 13/02* (2006.01)
*B65G 13/06* (2006.01)
(Continued)

(52) U.S. Cl.
CPC ............. *B65G 43/10* (2013.01); *B65G 13/04* (2013.01); *B65G 13/11* (2013.01);
(Continued)

(58) Field of Classification Search
CPC ........ B65G 13/02; B65G 13/06; B65G 37/02; B65G 43/00; B65G 43/08; B65G 43/10;
(Continued)

(56) References Cited

U.S. PATENT DOCUMENTS 1,725,740 A    8/1929   Schulte
4,241,825 A    12/1980  Brouwer
(Continued)

FOREIGN PATENT DOCUMENTS

DE           957 376 C        1/1957
DE     20 2004 020 677 U1    11/2005
(Continued)

OTHER PUBLICATIONS

Response to European Patent Office in PCT/AT2014/050241, dated Nov. 24, 2015, with English translation of relevant parts.
(Continued)

*Primary Examiner* — Leslie A Nicholson, III
*Assistant Examiner* — Lester Rushin
(74) *Attorney, Agent, or Firm* — Collard & Roe, P.C.

(57) ABSTRACT

Disclosed is a method for addressing/sequencing at least one control component (170 . . . 177) of a group comprising multiple control components (170 . . . 177) of a conveying system (1), said components being linearly interlinked via a daisy-chain selection line (23). The addressing process starts at any point in the chain and continues to the end of the respective branch of said chain. Subsequently, in one of the two branches the numbering of the control components (170 . . . 177) is reversed. Also disclosed is a conveying system (1) on which said method can be carried out.

18 Claims, 7 Drawing Sheets

(51) Int. Cl.
   *B65G 37/02* (2006.01)
   *B65G 43/00* (2006.01)
   *B65G 43/08* (2006.01)
   *B65G 43/10* (2006.01)
   *H04L 29/12* (2006.01)
   *G05B 19/042* (2006.01)
   *B65G 13/04* (2006.01)
   *B65G 13/11* (2006.01)

(52) U.S. Cl.
   CPC ...... *G05B 19/0426* (2013.01); *H04L 61/2038* (2013.01); *B65G 2201/0235* (2013.01); *B65G 2203/0266* (2013.01); *G05B 2219/21039* (2013.01)

(58) Field of Classification Search
   CPC ...... B65G 2201/025; B65G 2201/0264; B65G 2203/044
   USPC .......................................................... 198/783
   See application file for complete search history.

(56) References Cited

U.S. PATENT DOCUMENTS

| | | |
   |---|---|---|
   | 4,832,185 A | 5/1989 | Huber |
   | 5,022,513 A | 6/1991 | Huber |
   | 5,088,596 A | 2/1992 | Agnoff |
   | 5,442,248 A | 8/1995 | Agnoff |
   | 5,582,286 A | 12/1996 | Kalm et al. |
   | 6,206,181 B1 | 3/2001 | Syverson |
   | 6,367,617 B1 | 4/2002 | Schiesser et al. |
   | 6,447,336 B1 | 9/2002 | Fannin et al. |
   | 6,672,449 B2 | 1/2004 | Nakamura et al. |
   | 6,710,505 B1 | 3/2004 | Barani et al. |
   | 6,718,101 B2 | 4/2004 | Le Noane et al. |
   | 6,726,003 B2 | 4/2004 | Itoh et al. |
   | 6,879,078 B2 | 4/2005 | Wolters |
   | 7,035,714 B2 * | 4/2006 | Anderson .............. B65G 13/02 198/358 |
   | 7,362,016 B2 | 4/2008 | Cheng |
   | 7,618,352 B1 | 11/2009 | Wei |
   | 8,307,976 B2 | 11/2012 | Kraetz et al. |
   | 8,381,901 B2 | 2/2013 | Yamamoto |
   | 8,983,651 B2 | 3/2015 | Combs et al. |
   | 9,150,357 B2 | 10/2015 | Hager |
   | 2001/0037929 A1 | 11/2001 | Bond, Jr. et al. |
   | 2004/0035684 A1 | 2/2004 | Fukuoka |
   | 2004/0163934 A1 | 8/2004 | Kanaris |
   | 2004/0195078 A1 | 10/2004 | Anderson et al. |
   | 2007/0187132 A1 | 8/2007 | Watt |
   | 2009/0166157 A1 | 7/2009 | Kraetz et al. |

FOREIGN PATENT DOCUMENTS

| | | |
   |---|---|---|
   | DE | 10 2004 043 197 A1 | 3/2006 |
   | DE | 10 2010 002758 A1 | 9/2011 |
   | EP | 0 300 128 A1 | 1/1989 |
   | EP | 1 285 869 A2 | 2/2003 |
   | EP | 1 222 125 B1 | 10/2005 |
   | EP | 2 455 310 A1 | 5/2012 |
   | FR | 2 810 747 A1 | 12/2001 |
   | GB | 2 435 124 A | 8/2007 |
   | JP | S52-8882 U | 1/1977 |
   | JP | S60-122615 A | 7/1985 |
   | JP | H04-144812 A | 5/1992 |
   | JP | H10-181829 A | 7/1998 |
   | JP | 2000-247423 A | 9/2000 |
   | JP | 2003-051362 A | 2/2003 |
   | JP | 2010-235292 A | 10/2010 |
   | WO | 2004/067416 A1 | 8/2004 |
   | WO | 2007/036421 A1 | 4/2007 |
   | WO | 2011/029120 A1 | 3/2011 |
   | WO | 2011/032196 A1 | 3/2011 |
   | WO | 2012/094690 A1 | 7/2012 |
   | WO | 2013-000006 | 1/2013 |

OTHER PUBLICATIONS

Response to European Patent Office in PCT/AT2014/050242, dated Aug. 6, 2015, with English translation of relevant parts.
   International Search Report of PCT/AT2014/050265, mailed May 11, 2015.
   International Search Report of PCT/AT2014/050240, mailed Feb. 13, 2015.
   International Search Report of PCT/AT2014/050241, mailed Feb. 17, 2015.
   International Search Report of PCT/AT2014/050242, mailed Feb. 18, 2015.
   Response to European Patent Office in PCT/AT2014/050265, dated Sep. 4, 2015, with English translation of relevant parts.
   Response to European Patent Office in PCT/AT2014/050240, dated Sep. 4, 2015, with English translation of relevant parts.

* cited by examiner

METHOD FOR ADDRESSING/SEQUENCING LINEARLY INTERLINKED CONTROL COMPONENTS OF A CONVEYING SYSTEM

CROSS REFERENCE TO RELATED APPLICATIONS

This application is the National Stage of PCT/AT2014/050265 filed on Nov. 6, 2014, which claims priority under 35 U.S.C. §119 of Austrian Application No. A 50737/2013 filed on Nov. 6, 2013, the disclosure of which is incorporated by reference. The international application under PCT article 21(2) was not published in English.

The invention relates to a method for addressing at least one control component of a group of multiple linearly interlinked control components of a conveying system and for determining the position of at least one control component from a group of multiple linearly interlinked control components of a conveying system. Furthermore, the invention relates to a conveying system, on which such a method can be performed.

According to the prior art the control components of a conveying system are also addressed by means of a clear address via a bus system. In a known manner a control sends a message via the bus, which is provided with the addressee. The subscribers connected to the bus check whether an incoming message is intended for them in that they compare the said addressee with their own address. In this way it is ensured that a control component of a conveying system can be addressed specifically.

The problem here is that a bus address usually does not reveal anything about the physical location of the control component. Therefore, if control components have to be controlled in a specific sequence particular precautions have to be taken. For example, this relates to conveyor rollers arranged behind one another physically in a conveying system, the bus addresses of which are "varied" without special precautions.

To address this problem US 2004/0195078 A1 discloses a method, by means of which conveyor rollers lying behind one another can be addressed according to their physical sequence. For this purpose the controls of the conveyor rollers are connected to one another in series by a "daisy-chain line" or linearly. The addressing process now starts at one end of the chain and runs to the end of the latter, wherein a signal is passed on via the daisy-chain line successively from one control to the next. By means of this "passing on" a superordinate control is able to determine the physical sequence of the conveyor rollers.

The disadvantage of this is that the connection of a superordinate control to one end of the daisy-chain line is sometimes difficult in reality. If it is not possible to arrange the superordinate control in the immediate vicinity of one end of the daisy-chain line for example for structural reasons, an extra line has to be laid at great expense. Apart from the cost in terms of manufacturing technology, the laying of a cable is prone to error not least because of the length of the cable and interference interspersed over the latter.

One objective is therefore to provide a method or a conveying system, in which an addressing process of control components or the detection of a physical sequence thereof can be performed flexibly. In particular, the aim is to avoid the aforementioned disadvantages.

The objective of the invention is achieved by a method for addressing/sequencing at least one control component of a group of multiple linearly interlinked control components of a conveying system, comprising the steps a) step-by-step addressing of control components, which are arranged from any control component to a first end of the said chain, by means of a daisy-chain selection line, wherein ascending/descending addresses are allocated and/or the sequence of addresses allocated without any order is saved, b) step-by-step addressing of the control components, which from the control component, which is opposite the control component mentioned in step a) relative to the first end of the linear chain, are arranged up to the second end of the said chain, by means of a daisy-chain selection line, wherein ascending/descending addresses are allocated and/or the sequence of addresses allocated without any order is saved, c1) ascending/descending addressing of the control components addressed in step a) in a reverse sequence and subsequent ascending/descending addressing of the control components addressed in step b) in an unchanging sequence or c2) ascending/descending addressing of the control components addressed in step b) in reverse sequence and subsequent ascending/descending addressing of the control components addressed in step a) in an unchanging sequence or c3) allocating all of the assigned addresses to the sequence given in step C1) or C2).

The objective of the invention is also achieved by means of a conveying system, comprising a group of multiple control components (170 . . . 177) interlinked linearly by means of daisy-chain selection line (23)

means for the step-by-step addressing of control components (170 . . . 177), which are arranged from any control component (170 . . . 177) to a first and a second end of the said chain, by means of the daisy-Chain selection line (23), means for allocating ascending/descending addresses to the step-by-step addressed control components (170 . . . 177) and/or for saving a sequence of addresses allocated without any order to the control components (170 . . . 177), means for ascending/descending addressing all of the control components (170 . . . 177) of the group according to their sequence in the said chain by way of the step-by-step addressing process or for allocating all of the assigned addresses to the said sequence.

It is advantageous to arrange a superordinate control in the immediate vicinity of one end of the daisy-chain line and that an expensive cabling to the latter is no longer necessary due to the proposed measures. An addressing process of control components or detecting a physical sequence of the latter can thus be performed flexibly. The cabling is also less prone to failure. In particular—but not exclusively—the proposed method and the proposed conveying system relate to addressing control components of a plurality of conveyor rollers of the conveying system.

Further advantageous configurations and developments of the invention are described in the subclaims and in the description in connection with the Figures.

It is advantageous if the allocation of an address to a control component or reading of an address from a control component is performed via a communication bus, to which all of the control components of the group are connected equally. Likewise, it is advantageous if the conveying system comprises a communication bus which connects the control components to one another or to the superordinate control. In this way the control components can exchange comparatively complex messages with the superordinate control or with one another. For example, the communication bus can be designed as a CAN bus.

It is advantageous if the allocation of an address and/or saving the sequence of not ordered allocated addresses during the addressing of control components is/are controlled by a superordinate control. It is also advantageous if the conveying system has a superordinate control for controlling the addressing process of the said control components. In this way the control components do not have any means of coordinating the addressing process and can thus be designed to be simpler.

For this purpose the superordinate control can also comprise

- means for allocating ascending/descending addresses to the step-by-step addressed control components and/or for saving a sequence of addresses allocated without any order to the control components and
- means for the ascending/descending addressing of all control components of the group according to their sequence in the said chain by means of the step-by-step addressing processor for allocating all of the assigned addresses to the said sequence.

It is an advantage if for the selection of a control component to be currently addressed an intended signal is sent or applied via the daisy-chain selection line to the said control component and this is converted after completion of the addressing to the adjacent control component which follows in case a) in the direction of the first end of the said chain and in case b) in the direction of the second end of the said chain. In this way the control components can be addressed successively according to their physical sequence or their sequence can be determined.

It is an advantage if the said signal is conveyed by closing a switch interrupting the daisy-chain selection line. In this way the control component does not need any means for producing the selection signal.

It is also advantageous however if the said signal is conveyed by the active generation of the latter. In this way a switch for connecting the individual parts of the daisy-chain selection line can be omitted.

It is advantageous if step a) is started by sending/applying a signals for starting an addressing process via a first branch of the daisy-chain selection line interrupted between two control components and step b) is started by sending/applying a signal for starting an addressing process via the second branch of the daisy-chain selection line interrupted between two control components. It is advantageous in this connection if the said signals are sent/applied by a superordinate control, which is connected to the two branches of the daisy-chain selection line. It is also advantageous if the daisy-chain selection line is interrupted between two control components and both ends thereof are connected to the superordinate control. In this variant the addressing process is started at a physically specified point of the chain of the control components. The addressing method can therefore be reproduced easily.

In the above connection the method for addressing/sequencing at least one control component from a group of a plurality of linearly interlinked control components of a conveying system in an advantageous variant comprises the steps:

a) sending a signal for starting an addressing process via a daisy-chain selection line from a superordinate control to a specific control component of the group, b) sending a command for starting an addressing process via a communication bus, to which the said control components are connected equivalently, by the superordinate control, c) sending a confirmation of readiness for the addressing process via the communication bus, from the control component, which receives the signal for starting an addressing process at a input line-connected to the daisy-chain selection line, to the superordinate control, d) sending an address via the communication bus from the superordinate control to the control component mentioned in step c), provided that the confirmation of readiness in the superordinate control is received within a specified period, or continuing at step f), if this is not the case, e) sending a confirmation of an executed addressing process via the communication bus from the control component mentioned in step c) to the superordinate control, outputting a signal for starting the addressing process to an output at which a segment of the daisy-chain selection line is connected, which is opposite the input mentioned in step c) relative to the linear chain and continuing at step b), f) sending a signal for starting an addressing process via the daisy-chain selection line from the superordinate control to a specific control component of the group, which is opposite the control component mentioned in step a) relative to the linear chain and continuing at step b), provided that step f) has not yet been executed, or continuing at one of steps step g1) to g3), if this is not the case, g1) ascending addressing the control components addressed up to step f) in reverse sequence and then ascending addressing of the control components addressed from step f) in an unchanging sequence or g2) ascending addressing of the control components addressed from step i) in reverse sequence and after this the ascending addressing of the control components addressed up to step f) in an unchanging sequence or g3) allocating ail of the assigned addresses to the sequence given in step g1) or g2).

For the sake of completion it is noted that the steps a) and b) mentioned in this method do not correspond to steps a) and b) of the method defined further above.

It is also advantageous if the signal for the control component to be addressed currently is sent or applied to the latter in the form of a bit sequence, a voltage level, a current level or change in the level of voltage and/or current via the daisy-chain selection line. In this way easily available components can be used for generating the signal and/or recognizing the signal for the disclosed addressing method.

In general, it is advantageous if all of the control components of at least part of the group or also all of the control components of the group are addressed before step a) with clear addresses for the control components in a not ordered or random manner (both in the method defined by steps a) to c3) and in the method defined by steps a) to g3)). In this way the control components can also be addressed specifically before the expiry of the presented address process.

It is advantageous in this connection if step a) begins with the control component with the lowest/highest address of the said part of the group begins or if step a) begins with a randomly selected control component of the said part of the group. In both variants it is not necessary to apply a signal to the daisy-chain line. As a result a superordinate control does not need to be connected to the daisy-chain line and can therefore be positioned more flexibly.

In the above case, the method for addressing/sequencing at least one control component of a group of multiple linearly interlinked control components of a conveying system comprises in an advantageous variant the steps:

a0) addressing all of the control components of the group in a random or not ordered manner with clear addresses far the control components, b0) sending a command for starting an addressing process via a communication bus, to which the said control components are connected equivalently, from the superordinate control to a specific control component which is selected by the superordinate control, c0) sending a confirmation of readiness for the addressing process via the communication bus, from the control component mentioned in step b0) to the superordinate control and continuing at step d)

b) sending a command for starting an addressing process via a communication bus, to which the said control components are connected equivalently, by a superordinate control, c) sending a confirmation of readiness for the addressing process via the communication bus, from the control component, which receives the signal for starting an addressing process at an input connected to the daisy-chain selection line, to the superordinate control, d) sending an address via the communication bus from the superordinate control to the control component mentioned in step c) or c0), provided that the confirmation of readiness in the superordinate control is received within a specified period, or continuing at step f), if this is not the case, e) sending a confirmation of an executed address process via the communication bus from the control component mentioned in step c) or c0) to the superordinate control, outputting a signal for starting the addressing process to an output, at which a segment of the daisy-chain selection line is connected, which is opposite the input mentioned in step c) or c0) relative to the linear chain and continuing at step b), f) sending a signal for starting an addressing process via the daisy-chain selection line from the superordinate to a specific control component of the group, which is opposite the control component mentioned in step a) or b0) relative to the linear chain and continuing at step b), provided that step f) has not yet been executed, or continuing at one of steps g1) to g3), if this is not the case, g1) ascending addressing of the control components addressed up to step f) in reverse sequence and then ascending addressing of the control components addressed from step i) in an unchanging sequence or g2) ascending addressing of the control components addressed from step f) in reverse sequence and after this the ascending addressing of the control components addressed up to step f) in an unchanging sequence or g3) allocating all of the assigned addresses to the ascending sequence given in g1) or g2).

It is advantageous if a control component comprises a drive control for a conveyor roller of the conveying system, as the advantages of the proposed method or the conveying system are particularly evident.

At this point is should be noted that the embodiment variants disclosed for the proposed method and the resulting advantages relate equally to the proposed conveying system and vice versa.

For a better understanding of the invention the latter is explained in more detail with reference to the following Figures.

In the latter:

FIG. 1 shows by way of example a section of a conveying system 1 obliquely from above;

FIG. 2 as FIG. 1, only obliquely from the rear;

FIG. 3 as FIG. 1, only obliquely from below;

Figure 5:
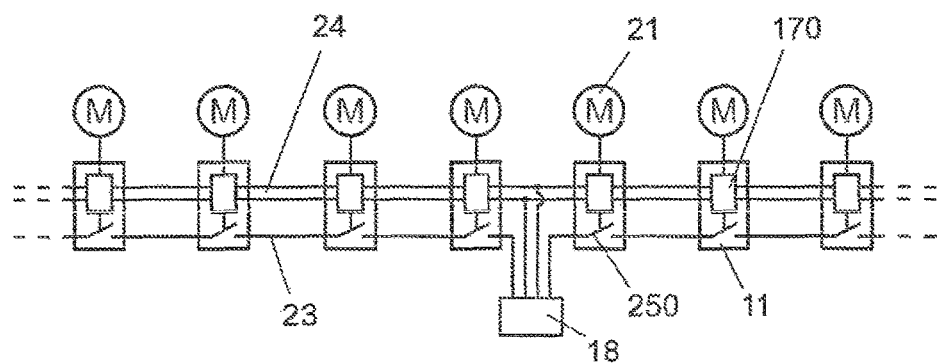
FIG. 5 shows linearly interlinked control components, in which a daisy-chain line is interrupted by a controllable switch.
Figure 6:
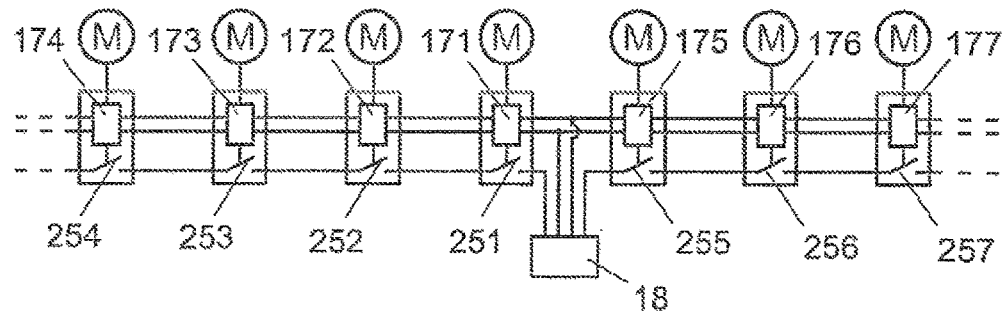
Figure 7:
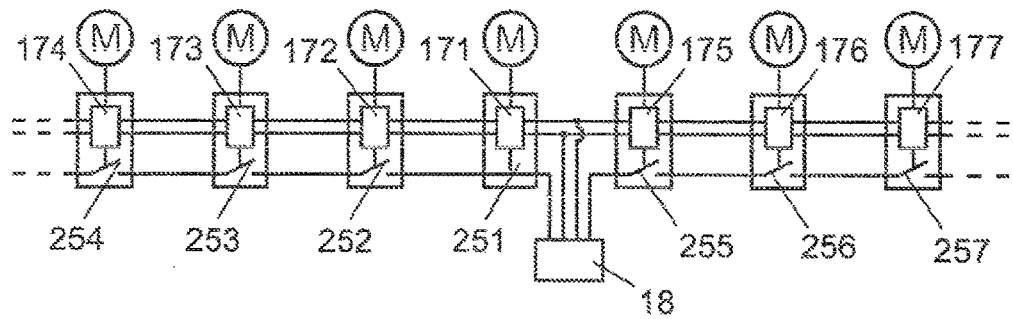
Figure 8:
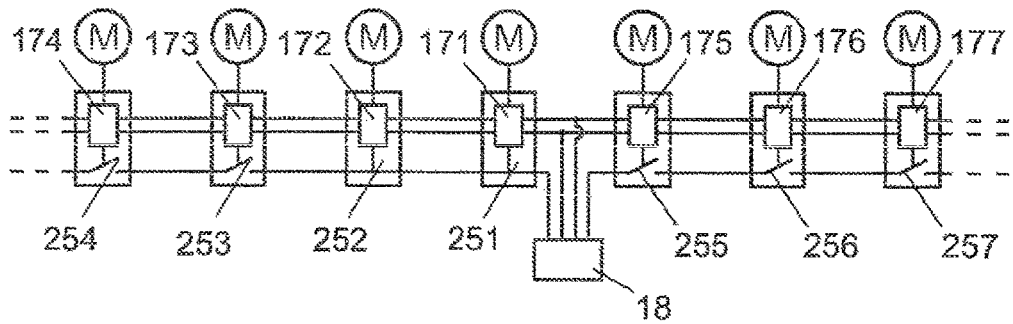
Figure 9:
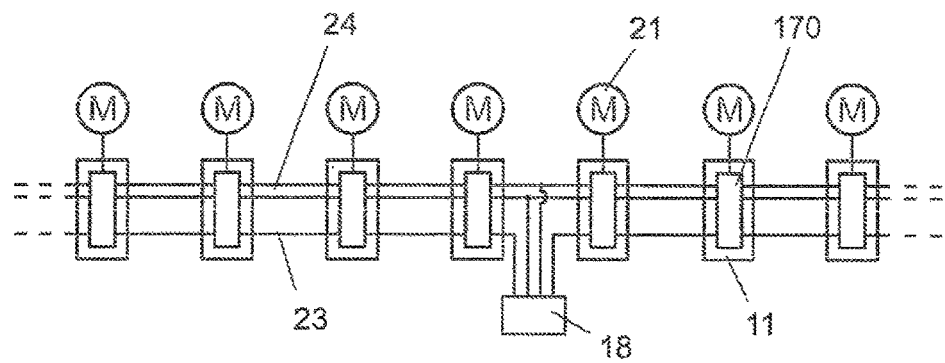
Figure 10:
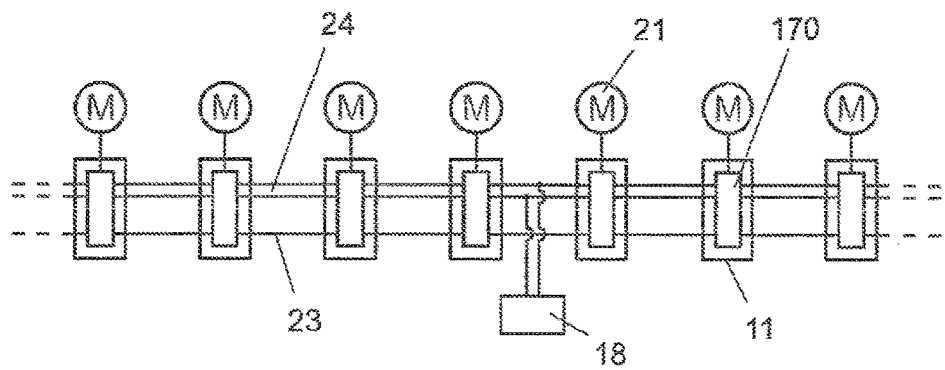
Figure 11:
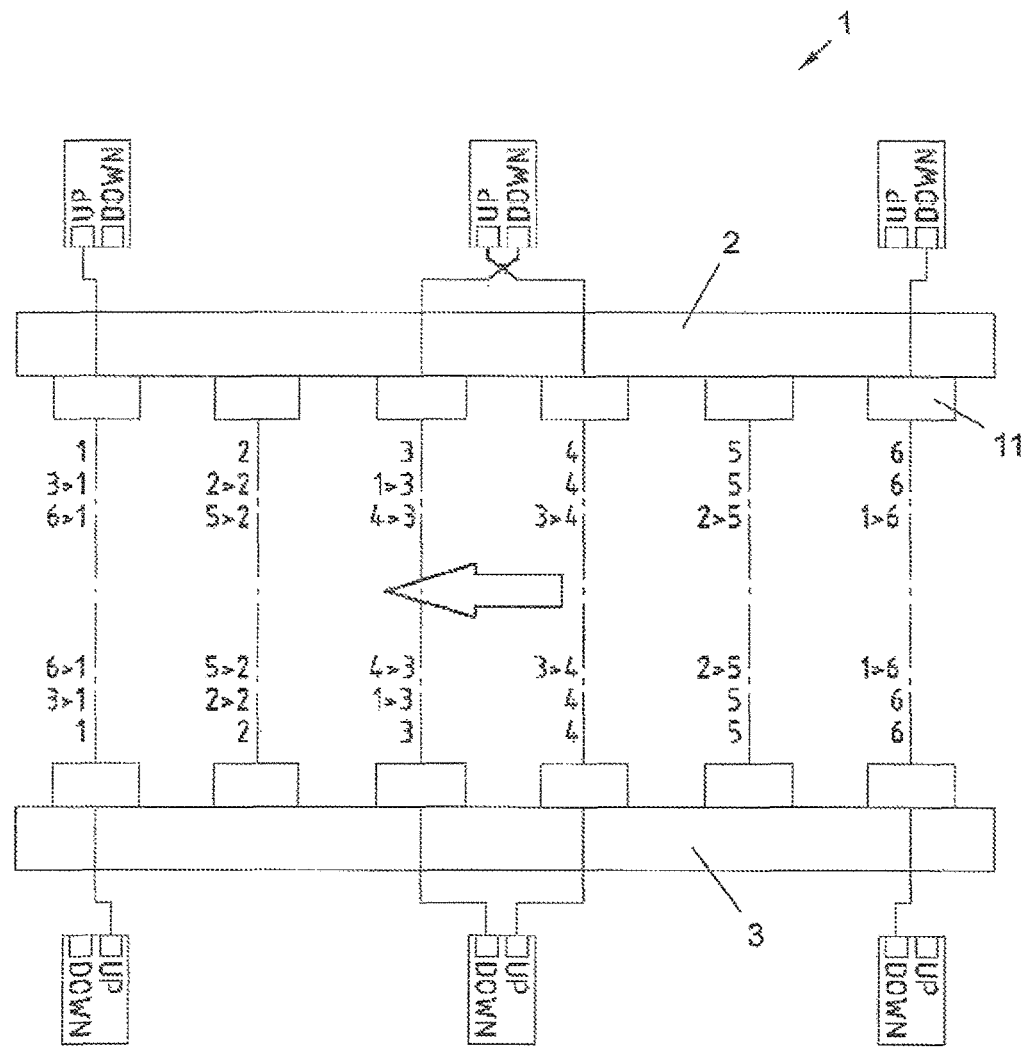

FIG. 6 as FIG. 5, only with a clearly denoted control components or switches in a first state;

FIG. 7 as FIG. 6 only with one already closed switch;

FIG. 8 as FIG. 6 only with two already closed switches;

FIG. 9 shows linearly interlinked control components, in which a daisy-chain line is connected to signal inputs/outputs of the control component;

FIG. 10 shows linearly interlinked control components, in which a superordinate control is not connected to the daisy-chain line and FIG. 11 shows a schematic representation of an addressing process.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and incase of a change in position should be adjusted to the new position. Furthermore, also individual features or combinations of features from the various exemplary embodiments shown and described can represent in themselves independent or inventive solutions.

Figure 1:
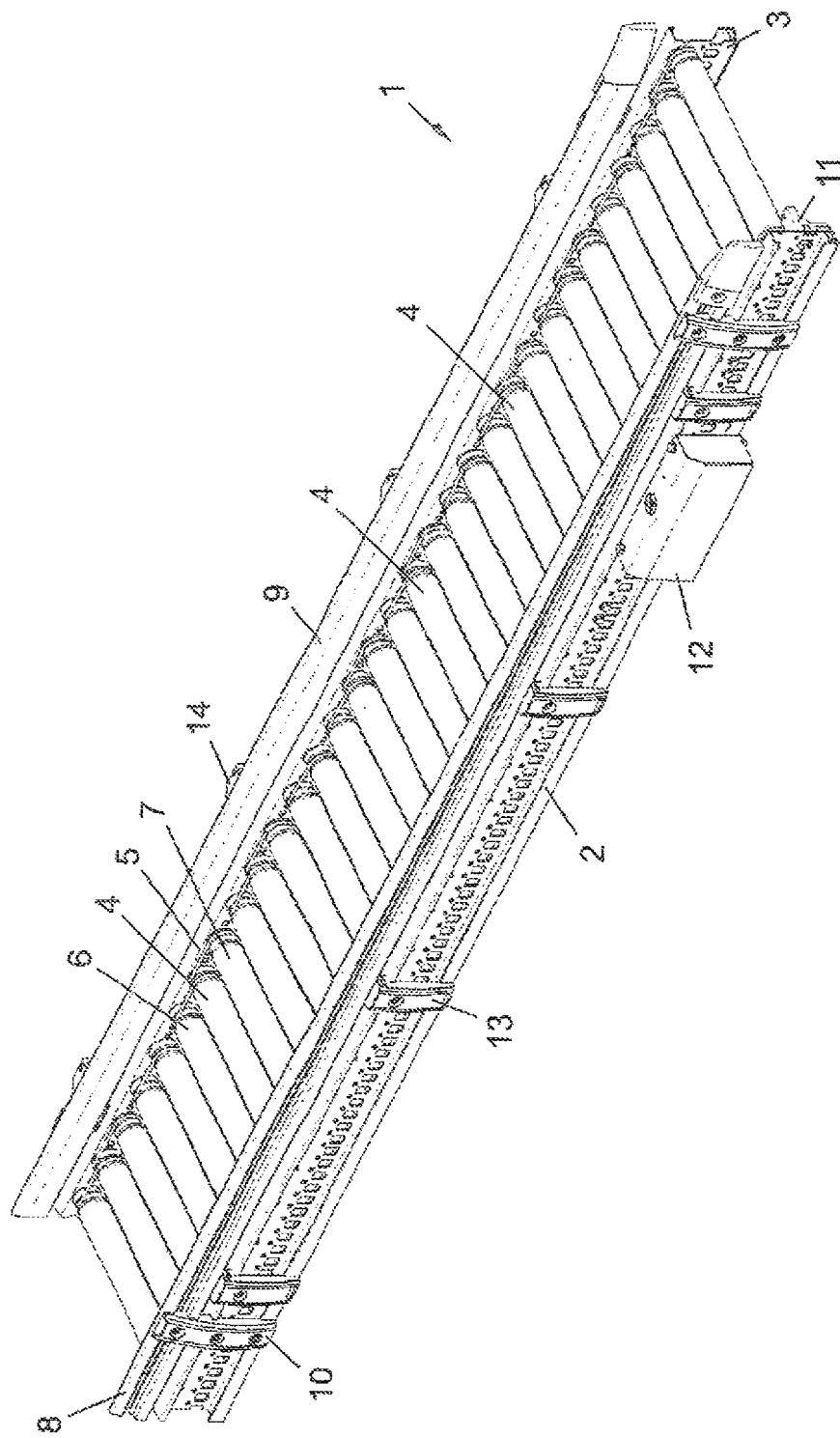

FIG. 1 shows an example of a section of a conveying system 1 obliquely from above. The conveying system 1 comprises two spaced apart frame profiles 2 and 3 as well as motorized conveyor rollers 4 arranged in between. By means of belts 5 additional non-motorized conveyor rollers 6 and 7 are also driven. Of course, it is not absolutely necessary for all of the conveyor rollers of the conveying system 1 to be driven directly or indirectly, but also idling rollers can be arranged between the frame profiles 2 and 3. It would also be possible for a conveyor belt or band to be placed over the conveyor rollers 4, 6, 7. In particular, the motorized conveyor roller 4 can be arranged at the end of the conveyor belt or band, as the wrapping angle of the belt or band is greater there. A separate belt 5 can be omitted when using a belt or band.

Furthermore, the conveying system 1 comprises optional guide rails 8 and 9, which are secured by mounting brackets 10 to the frame profiles 2 and 3. The latter are used for improving the lateral guiding of objects conveyed on the conveying system 1, e.g. containers, trays and cardboard packaging.

The motorized conveyor rollers 4 are connected via connection boxes 11 to a power supply bus and a data bus. The conveyor rollers 4 are controlled by the control 12. For the detection of conveyed objects photodetectors 13 can also be arranged over the frame profiles 2 and 3. In this example reflectors 14 are also arranged opposite this.

Figure 2:
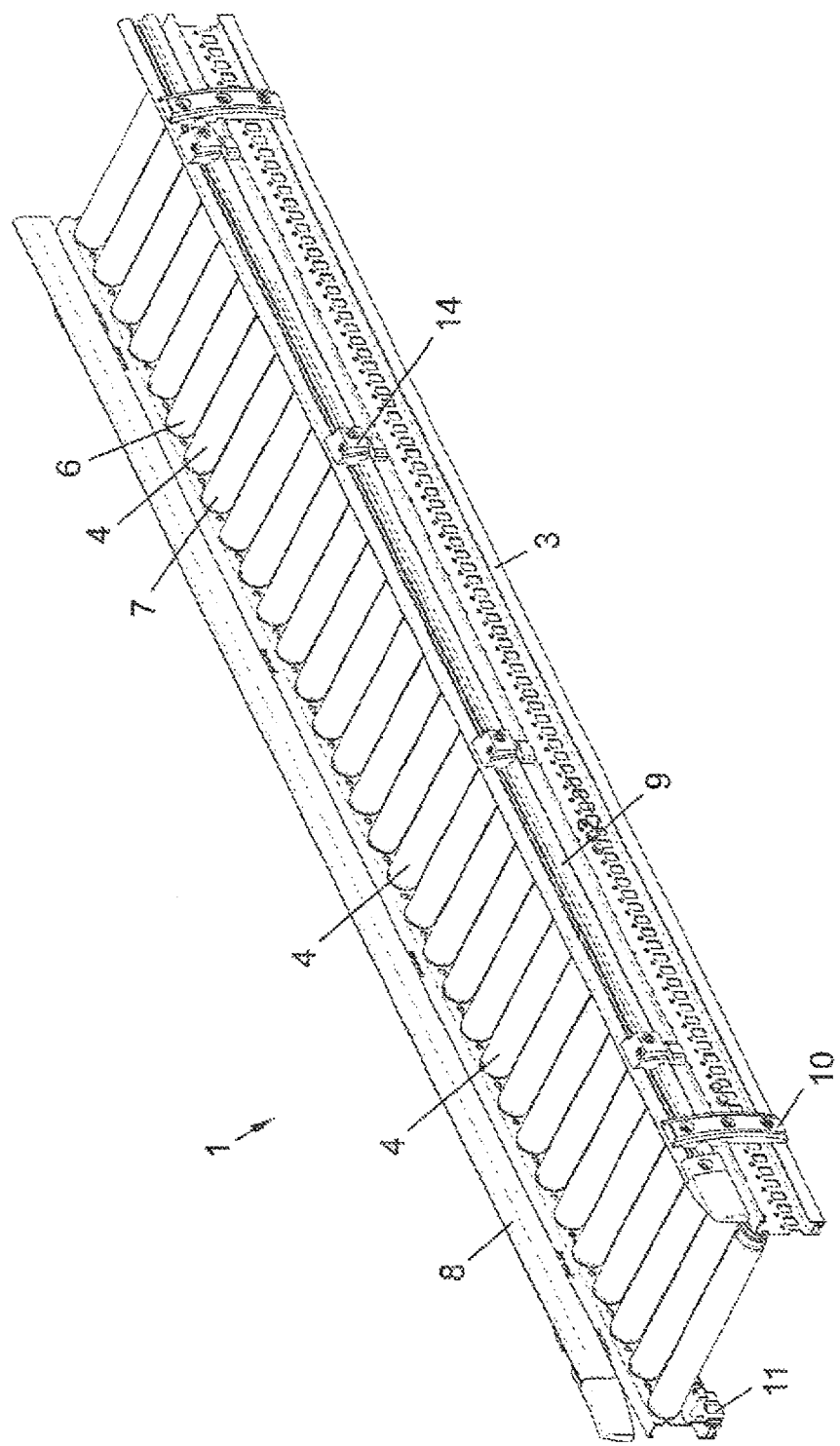
Figure 3:
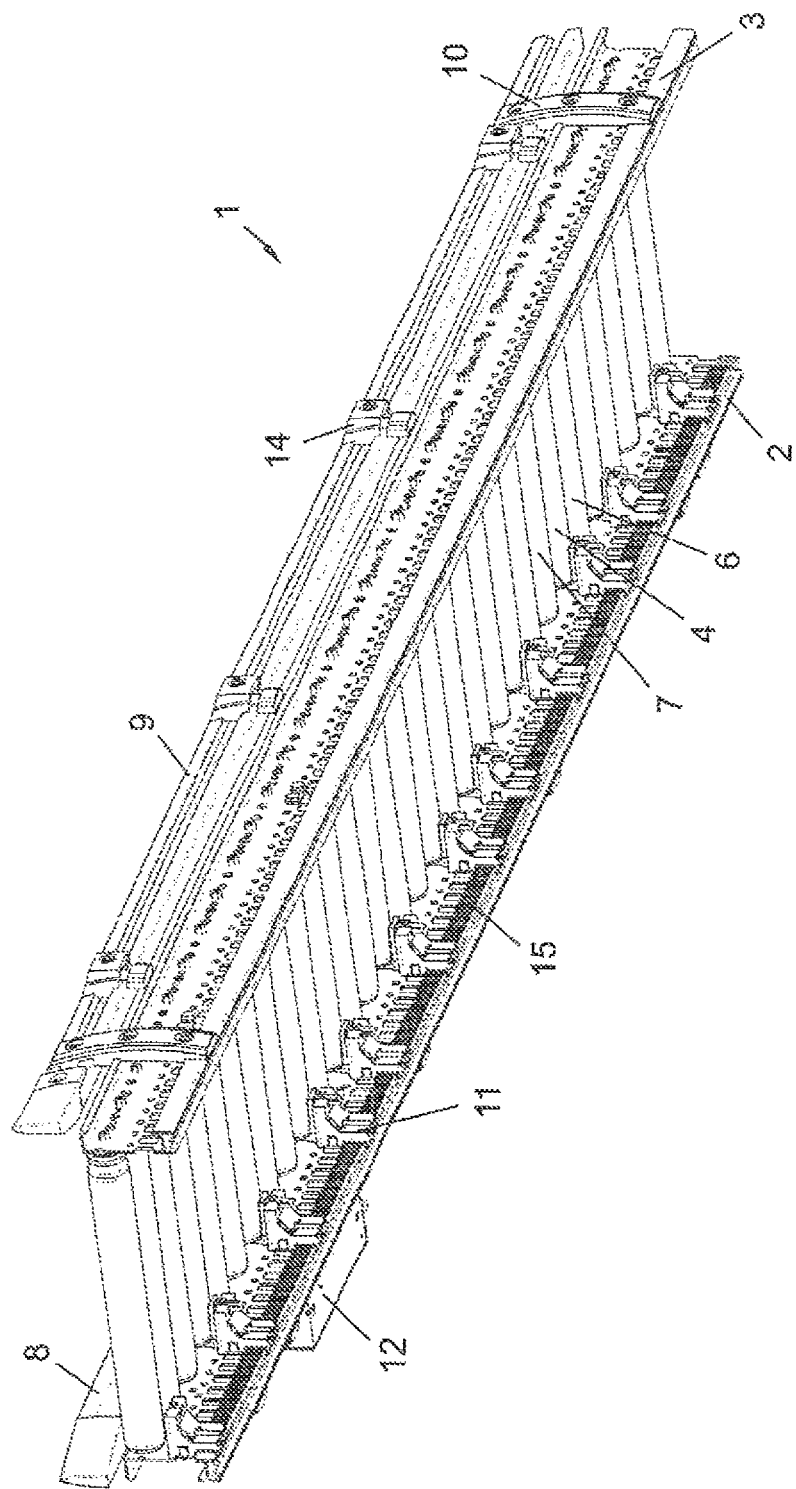

FIG. 2 shows the conveying system 1 already shown in FIG. 1 but obliquely from the rear, FIG. 3 obliquely from below. FIG. 3 therefore also shows the power supply bus 15 placed on the inside on the frame profile 2 (for example with a supply voltage of 24V or 48V).

Figure 4:
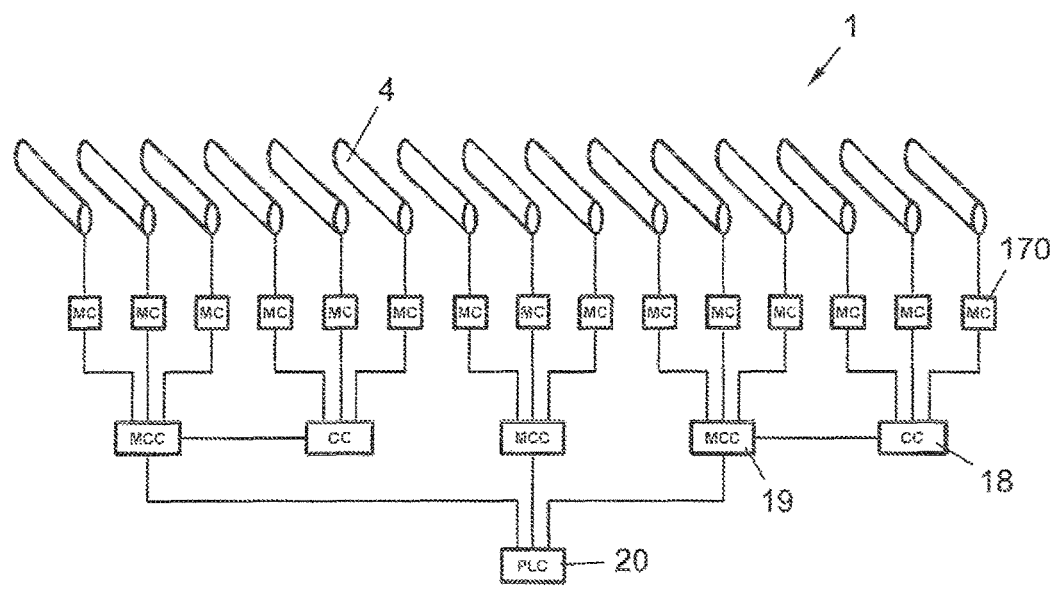
FIG. 4 shows an example of a block diagram of a conveying system.

FIG. 4 shows by way of example a block diagram of the conveying system 1 comprising a plurality of motor driven conveyer rollers 4 arranged behind one another. Of course, other not driven conveyor rollers 6, 7 could be arranged between the latter, as shown in FIGS. 1 to 3.

In this example a motor controller 17 (as denoted in FIG. 4 by "MC") is allocated to each motorized conveyor roller 4. A plurality of motor controllers 170 are connected (e.g. via a CAN bus) to a conveyor controller 18 (as denoted in FIG. 4 by "CC") or master conveyor controller 19 (as denoted in FIG. 4 by "MCC"). The master conveyor controllers 19 generally have the purpose of determining from the commands of a central control 20 (as denoted in FIG. 4 by "PLC") the necessary instructions to the motor controller 170 of the individual conveyor rollers 4, or to receive status messages from the latter and to direct information about status messages on to the central control 20. For example, the control 12 shown in FIGS. 1 to 3 can be formed by a conveyor controller 18, a master conveyor controller 19 or also by the central control 20.

However, not only motor controllers 170, but (for example via the Ethernet) also conveyor controllers 18 are connected to the master conveyor controller 19. The latter are completely equivalent to the master conveyor controllers 19, apart from the fact that only the master conveyor controller 19 is connected directly (e.g. via the Ethernet or Profibus) to the central control 20 and communicates with the latter. In this way only the master conveyor controller 19 adopts commands from the central control 20 and if necessary generates commands to the conveyor controller 18 or transfers information from the conveyor controllers 18 to the central control 20. The conveyor roller 4 itself comprises in this hierarchy in electrical terms only the motor, a temperature sensor and Hall sensors, and is connected to a motor controller 170.

The motor controllers 170 of the individual conveyor rollers 4 are joined together by cables, which have at least one wire for a daisy-chain line, and two wires for a data bus.

FIG. 5 shows an example of an arrangement in which a plurality of motors 21 (as denoted in FIG. 5 by "M") of the conveyor rollers 4 are connected respectively to a connection box 11. Said connection box 11 comprises the motor controller 170 and can also comprise additional components, for example the option for connecting light barriers 13, switches and the like and in particular also the option for connecting a power supply 15 (see FIG. 1 to 3), which is not shown in FIG. 5 for a better overview. The connection boxes 11 or the motor controllers 170 are connected to one another by a daisy-chain line 23 and by a data bus 24. As shown in FIG. 5, the daisy-chain line 23 inside the connection boxes 11 is separated respectively by a switch 250 which can be controlled via the motor controller 170. FIG. 5 shows for a better overview a single conveyor controller 18 which is connected to the motor controllers 170. Of course, also a master conveyor controller 19 could be provided as an equivalent instead of the conveyor controller 18 which is connected to the motor controllers 170. Of course, the hierarchy shown in FIG. 4 could also be implemented. The conveyor controller 18 is connected in this example to the daisy-chain line 23 and also the data bus 24.

The function of the arrangement shown in FIG. 4 or 5 will now be explained in more detail with reference to FIGS. 6 to 8. The conveyor controller 18 is shown there by way of example. Instead of this the master conveyor controller 19 or the central control 20 can be used equally (the same also applies to the embodiments according to FIGS. 9 and 10).

Each motor controller 171 . . . 177 has an effective bus address, by means of which incoming messages can be filtered and outgoing messages can be sent. In addition, each motor controller 171 . . . 177 has an allocated address, which is placed in a non-volatile memory. Said address becomes the effective address on the transition from an initial state to a normal state.

In the initial state the motor controllers 171 . . . 177 only react to a bus reset telegram and ignore all other CAN messages. At the same time they check whether there is a level transfer from "low" to "high" on the daisy-chain line 23. Preferably, the relevant signal should remain "high" for a specific period to ignore disturbances on the daisy-chain line 23. If the said low to high transition has taken place, the motor controller 171 . . . 177 is selected which has detected the level transition. In FIG. 6 this is the motor controller 171, as it is assumed that the conveyor controller 18 applies the said signal only to the left branch of the daisy-chain line 23. The motor controller 171 now accepts the default address (e.g. "127") as the effective address and then reacts to CAN messages. The switches 251 . . . 257 and in particular the switch 251 remain open for the time being.

Now the conveyor controller 18 or the master conveyor controller 19 can gain access normally via the default address to the selected motor controller 171 and query the allocated address for example or change the latter. With a falling flank on the daisy-chain line 23, i.e. a transition from "high" to "low" the motor controller 171 accepts the allocated address as an effective address and passes into the normal state.

Of the motor controllers 171 . . . 177, which are still in the initial state, only the first one reacts to the default address, because it is selected by the signal on the daisy-chain line 23 and ensures via the switch 251 that the remainder of the chain is not selected. Motor controllers 171 . . . 177, which are already in the normal state and no longer in the initial state, have already accepted the allocated address as an effective address and thus no longer react to the default address.

In a normal state in which the switch 251 is closed the signal on the daisy-chain line 23 is transferred to the next motor controller 172 in the chain. In this way the conveyor controller 18 can select the next motor controller 172 in the chain via the daisy-chain line 23 and address the latter via the CAN bus with the default address (e.g. "127"). This state is shown in FIG. 7.

FIG. 8 shows an additional state in which the motor controllers 171, 172, 173 have already been addressed and the switches 251 and 252 are closed. The said addressing process is repeated recursively until all of the motor controllers 171 . . . 177 in the chain have been addressed and are in a normal state.

The end of the chain can be established for example in that no motor controller 171 . . . 177 responds to an addressing command of the conveyor controller 18 within a predefined period (timeout). In a specific example this means that a signal on the daisy-chain line 23 after addressing of the motor controller 174 goes "nowhere" and no motor controller 171 . . . 177 responds to a command for addressing.

If this occurs the right branch of the chain is then addressed in a very similar way. By applying the signal indicated above to the right branch of the daisy-chain line 23 the motor controllers 175, 176 and 177 are now addressed successively;

In general terms a method is performed for addressing/sequencing at least one control component 170 ... 177 from a group of multiple linearly interlinked control components 170 ... 177 of a conveying system 1, which comprises the following steps:
a) step-by-step addressing of control components 171 ... 174, which are arranged from any control component 171 to a first end of the said chain, by means of a daisy-chain selection line (23),
b) step-by-step addressing of the control components 175 ... 177, which from the control component 175, which is opposite the control component 171 mentioned in step a) relative to the first end of the linear chain, are arranged up to the second end of the said chain, by means of the daisy-chain selection line 23.

During the addressing process generally ascending/descending addresses can be allocated and/or the sequence of not ordered allocated addresses can be saved. In specific terms this means that the motor controllers 171 ... 177 are addressed with ascending/descending addresses or not ordered or random addresses are allocated and the position of a motor controller 171 ... 177 (that is its rank in the sequence of the group of motor controllers 171 ... 177) is recorded in table for example. It should be noted at this point that with ascending/descending address processes it is not absolutely necessary to allocate addresses that are incremented/decremented by 1. Instead of this also other increments/decrements can be used. For example the addresses 17, 25, 45, 98 do not necessarily increase by 1, but are still clear and also reflect a series or sequence of motor controllers 171 ... 177 correctly. The same applies to the sequence recorded in a table.

After addressing the motor controllers 171 ... 177 of the two branches the latter only need to be put into the correct sequence. In addition, either the sequence of the left or right branch is reversed, whereby then all of the motor controllers 171 ... 177 are addressed or sequenced in ascending/descending or descending sequence.

In general terms, after steps a) and b) thus the following steps are performed:
c1) ascending/descending addressing of the control components 171 ... 174 addressed in step a) in a reverse sequence and subsequent ascending/descending addressing ox the control components 175 ... 177 addressed in step b) in an unchanging sequence or
c2) ascending/descending addressing of the control components 175 ... 177 addressed in step b) in a reverse sequence and subsequent ascending/descending addressing of the control components 171 ... 174 addressed in step a) in an unchanging sequence or
c3) allocating all of the assigned addresses to the ascending sequence given in C1) or C2).

Steps C1) and C2) thereby relates to embodiment variants in which the motor controllers 171 ... 177 are addressed directly with ascending/descending addresses. Step C3) relates to a variant in which not ordered or also random addresses are allocated and the position of a motor controller 171 ... 177 is recorded in a table for example.

To perform the steps C1), C2) or C3) in the conveyor controller 18 during the addressing process it recorded for example which motor controller 171 ... 177 belongs to which branch, by means of a status bit which is set in a table. It would also be possible to save the initial address and/or end address of a branch in the conveyor controller 18.

In general, it also possible that the proposed auto-addressing can be skipped or another addressing process can be performed afterwards, provided the sequence of motor controllers 171 ... 177 is determined in a different way than indicated. The bus reset telegram has a parameter for this which can accept the value "skip auto addressing" or "do auto addressing". By means of said telegram each motor controller 171 ... 177 goes back into the initial state, regardless of which state it is in at the moment. If the parameter "skip-auto-addressing" is set, each motor controller 171 ... 177 immediately accepts the allocated address as the effective address and changes into the normal state. In this way it is possible after starting up the conveying system 1 to reach the normal state more quickly. Furthermore, problems occurring during the auto-addressing, which are caused for example by faults in the cabling, can be temporarily disregarded, so that the control of the conveying system 1 remains functional until the next maintenance interval.

The addressing of the master conveyor controller 19 and conveyor controller 18 itself can be performed manually via an Ini-File, which is saved on an SD memory card (Secure Digital Memory Card) and inserted into the conveyor controller 18 or master convex or controller 19.

Generally, the method proposed in FIGS. 5 to 8 has the following features:
- The allocation of an address to a control component or reading of an address from a control component 170 ... 177 is performed via a communication bus 24, to which all of the control components 170 ... 177 of the group are equally connected.
- The allocation of an address and/or saving the sequence of addresses allocated without any order during the addressing of control components 170 ... 177 is controlled by a superordinate control 18, 19, 20.
- For the selection of a control component 170 ... 177 to be currently addressed a signal provided for this is sent or applied via the daisy-chain selection line 23 to the said control component 170 ... 177, and this is conveyed after a successful addressing process to the adjacent control component 175, which in case a) follows in the direction of the first end of the said chain and in case b) in the direction of the second end of the said chain.
- The conveying of the said signal is performed by closing a switch 250 ... 257 interrupting the daisy-chain selection line 23.
- Step a) is started by sending/applying a signal for starting an addressing process via a first branch of the daisy-chain selection line 23 interrupted between two control components 170 ... 177 and step b) by sending/applying a signal for starting an addressing process via the second branch of the daisy-chain selection line 23 interrupted between two control components 170 ... 177.
- The said signals are sent/applied by a superordinate control 18, 19, 20 which is connected to the two branches of the daisy-chain selection line 23.
- The signal for the control component 170 ... 177 to be currently addressed is sent or applied in a level change of the voltage on the daisy-chain selection line 23. It is equally possible that the signal for the control component 170 ... 177 to be currently addressed is sent or applied to the latter via the daisy-chain selection line 23 in the form of a bit sequence, a voltage level, a current level or a change of level of a current
- None of the control components 170 ... 177 of the group is addressed prior to step a) or the said control components 170 ... 177 are addressed by addresses which are not clear. However, it is also possible that all of the control components 170 . . . 177 of at least a portion of the group are addressed prior to step a) without any order or randomly with clear addresses for the control components 170 . . . 177.

In general, the conveying system 1 proposed in FIGS. 1 to 8 thus has the following features. The conveying system comprises:

a group of multiple control components 170 . . . 177 interlinked linearly by means of a daisy-chain selection line 23, means for the step-by-step addressing of control components 170 . . . 177, which are arranged from any control component 170 . . . 177 to a first and a second end of the said chain, by means of the daisy-chain selection line 23, means for allocating ascending/descending addresses to the step-by-step addressed control components 170 . . . 177 and/or for saving a sequence of addresses allocated without any order to the control components 170 . . . 177, means for the ascending/descending addressing of all control components 170 . . . 177 of the group according to their sequence in the said chain by means of the step-by-step addressing process or for allocating all of the assigned addresses to the said sequence.

In general the conveying system 1 presented in FIGS. 5 to 8 also has the following features:

the conveying system comprises a superordinate control 18, 29, 20 for controlling the addressing process of the said control components 170 . . . 177, the means for allocating ascending/descending addresses to step-by-step addressed control components 170 . . . 177 and/or for saving a sequence of addresses allocated without any order to the control components 170 . . . 177 are integrated into the superordinate control 18, 29, 20, the means for addressing in ascending/descending order all of the control components 170 . . . 177 of the group according to their sequence in the said chain with reference to the step-by-step addressing process or for allocating all of the allocated addresses to the said sequence are integrated into the superordinate control 18, 29, 20, the daisy-chain selection line 23 is interrupted between two control components 170 . . . 177 and both ends of the latter are connected to the superordinate control 18, 29, 20, the control components 170 . . . 177 are connected to one another or to the superordinate control 18, 19, 20 by a communication bus 24, the control component 170 . . . 177 comprises a drive control for a conveyor roller 4 of the conveying system 1.

In addition to the aforementioned variant another embodiment of the addressing process is also possible, which is shown schematically in FIG. 9. In this case the signal is conveyed on the daisy-chain selection line 23 not by closing a switch 250 . . . 257, but the "conveying" of the said signal is performed by actively generating the latter. In specific terms the motor controller 170 also comprises two daisy-chain connections which can function as an input and/or output. If the motor controller 170 is in the initial state the daisy-chain connections are configured as the input.

In the initial state the motor controller 170 reacts only to the bus reset telegram and ignores all other CAN messages. At the same time it checks whether at one of the daisy-chain connections there is level transition from "low" to "high" (and also remains high for a specific period, in order to ignore disturbances on the daisy-chain line 23). If the said low-high transition has occurred the motor controller 170 is selected which has detected the level transition. The motor controller 170 accepts, as already explained, the default address (e.g. "127") as the effective address and then reacts to CAN messages. At the same time it configures the other daisy-chain connection to the output and drives the level there to "low". Now the conveyor controller 18 can access the selected-motor controller 170 normally via the default address for example query the allocated address, or change the latter. With the falling flank on the daisy-chain input the motor controller 170 also accepts the allocated address as an effective address and enters into the normal state. Afterwards the level at the daisy-chain output is driven to "high", whereby the next motor controller 170 receives the selection signal required for the addressing process and the process can be start all over-again. The remainder of the sequence is performed in a-similar manner to the process described in FIGS. 4 to 8.

FIG. 10 shows a further variant of the addressing method. In this case the selection signal is conveyed on the daisy-chain line 23 as in the variant shown in FIG. 9 by actively generating the latter. In specific terms the motor controller 170 also comprises two daisy-chain connections which can function as the input and/or output.

The motor controllers 170 are provided at the beginning with clear addresses, that is each motor controller 170 can be addressed specifically. In this case for example ascending (but unordered) addresses or even random addresses can be allocated. The motor controllers 170 are still in the initial state and thus configure both daisy-chain connections as inputs.

To start the method the conveyor controller 18 sends a start signal to one of the motor controllers 170. For example this can be the motor controller 170 with the highest or lowest address or a randomly selected motor controller 170. To select this first motor controller 170 it is not necessary to send or apply a signal to the daisy-chain line 23, but the said motor controller 170 is addressed simply via its clear address.

In principle, it is also sufficient for the start of the method if a (single) motor controller 170 is provided with a clear address and the method is started there. The remaining motor controllers 170 can also be provided with unclear addresses or all of them can even have the same address.

The initially selected motor controller 170 now configures one of the two daisy-chain connections as an output and drives the level there to "low" The conveyor controller 18 can query the address assigned to the motor controller 170, or change the latter. Afterwards, the conveyor controller 18 sets the selected motor controller 170 to normal, after which the latter sets the level at the selected daisy-chain output to "high". In this way the next motor controller 170 receives the selection signal required for the addressing process and the addressing process can be continued op to the end of the chain in the already described manner. If the end of the chain is identified (for example as already indicated by a timeout), the conveyor controller 18 instructs the first addressed controller 170 to also configure the second daisy-chain connection as an output and generate a low-high flank there. In this way the addressing can also be performed in the other direction in the already described manner.

In general terms the disclosed method also has the following features:

all the control components 170 . . . 177 of at least part of the group are addressed without any order or randomly prior to step a) with clear addresses for the control components 170 . . . 177, step a) begins for example at the control component 170 . . . 177 with the lowest/highest address of the said part of the group, alternatively step a) begins with a randomly selected control component 170 . . . 177 of the said part of the group, alternatively at least one control component 170 . . . 177 is provided with a clear address at which step a) begins, the conveyor controller 18 does not need to be connected to the daisy-chain line 23.

During the addressing process also in this variant ascending/descending addresses can be allocated and/or the sequence of addresses allocated without any order are saved, in particular the sequence of addresses initially allocated before step a).

After addressing the motor controllers 171 . . . 177 of the two branches the latter only need to be put in the correct sequence, which can take place in the already described manner.

To perform the steps C1), C2) or C3) as described above in the conveyor controller 18 daring the addressing process for example it is noted which motor controller 171 . . . 177 belongs to which branch, by means of a status bit which is put in a table. It would also be possible for the starting address and/or end address of a branch to be saved in the conveyor controller 18.

If the motor controllers 171 . . . 177 have already been identified during the detection of their sequence with clear addresses, in principle there is no need to change the addresses, provided that the physical sequence is recorded in a table for example. However, it is also possible that the motor controllers 171 . . . 177 are readdressed in step C3) according to the save sequence and ascending/descending addresses are allocated.

A common feature of all of the disclosed variants is that the addressing can be started in principle at any point of the interlinked control components 171 . . . 177 and in any direction, without in this way influencing the correct sequence of the control components 171 . . . 177. It is advantageous that during the assembly of a conveying system 1 it does not need to be taken into consideration that the conveyor rollers 4 or the conveyor controllers 18 or the master conveyor controllers 19 have to be installed or connected at a specific point over the course of the conveying system 1. The structure of a conveying system 1 can therefore be very flexible.

FIG. 11 is intended to clarify this further. Here in the upper section a variant is shown in which the motor controllers 170 (in the connection box 11) are arranged on the right in conveying direction, which is shown by the arrow. In the lower section a variant is shown in which the motor controllers 170 are arranged on the left in conveying direction. The addressing process is started respectively in the "up" direction. The aim is to have descending addresses in conveying direction respectively. In the following three examples, the sequence allocated in the "down" branch, is maintained, the sequence in the "up" branch is reversed however.

In the first example (top left, first line) the "up" branch is not present, the chain of the motor controller 170 is therefore numbered or addressed in the "down" branch from 1 to 6. The obtained sequence corresponds directly to the desired sequence.

In the second example (top middle, second line) the numbers 1 to 3 are allocated in the "up" branch and the numbers 4 to 6 in the "down" branch. The numbers in the "up" branch are reversed according to the aforementioned rule. The obtained sequence corresponds in turn to the desired sequence.

In the third example (top right, third line) the "down" branch is not present, the chain of the motor controller 170 is therefore numbered or addressed in the "up" branch from 1 to 6. The obtained sequence is reversed and then corresponds to the desired sequence.

The sequence is thus completely independent of the starting point of the addressing process.

The further examples (bottom right, fourth line), (bottom middle, fifth line) and bottom left, sixth line) are completely analogous. The addressing process is started in the "up" direction respectively. However, now the sequence allocated in the "up" branch is maintained, the sequence in the "down" branch is reversed however. The aim is to have descending addresses in conveying direction.

Here too the sequence is independent of the starting point of the addressing process.

In the preceding examples a respective segment of the conveying system 1 is considered which is assigned to a conveyor controller 18 or a master conveyor controller 19. Of course, the method presented can also be applied in all variants even to a greater section of a conveying system 1 or a complete conveying system 1.

If the physical sequence of the conveyor controller 18/master conveyor controller 19 is known, a total sequence of the conveyor rollers 4 is formed in that in a first step the sequence is formed in the said segments and from this the whole sequence is formed together with the sequence of the conveyor controller 18/master conveyor controller 19. It is also possible that multiple segments are addressed or sequenced by the disclosed addressing method. In this case the control can be transferred on changing a segment from one of the conveyor controllers 18/master conveyor controllers 19 to another conveyor controller 18/master conveyor controller 19. For example said transfer can be coordinated by the central control 20. It is also possible for the addressing or sequencing as such to be performed by the central control 20, and the conveyor controller 18/master conveyor controller 19 pass on the necessary messages more or less transparently.

Of course, the disclosed method is not bound to one of the show system architectures, but the conveying system 1 can also be organized, differently in terms of control technology. In this connection it should be mentioned that the CAN bus and the Ethernet are advantageous for said method, but are only mentioned by way of example. Of course, also other communication technologies can be used including wireless communication.

In this connection the daisy-chain line 23 can also be designed to be wireless, for example in that the individual sections thereof are formed by optical communication sections. It would also be possible, that a selection signal is sent via infrared from one motor controller 170 to the next. By shading the connection box 11 it is ensured that the signal is only sent to a directly adjacent motor controller 170. The cost of wiring a conveying system is reduced in such a case to laying a power supply bus 15.

The shown examples describe the addressing or sequencing of conveyor rollers 4 of a conveying system 1. Of course, the disclosed method is not restricted to the addressing/sequencing of conveyor rollers 4, but can be also be applied to light barriers 13 for example.

The example embodiments show possible embodiment variants of a conveying system 1 or an addressing method for such a conveying system 1, whereby it should be noted at this point that the invention is not restricted to the embodiment variants thereof shown in particular, but rather various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

In particular, it should be noted that the conveying system 1 in reality can also comprise more or fewer components than are represented.

Finally, as a point of formality, it should be noted that for a better understanding of the structure of the conveying system 1 the latter and its components have not been represented true to scale in part and/or have been enlarged and/or reduced in size.

The underlying problem addressed by the independent solutions according to the invention can be taken from the description.

LIST OF REFERENCE NUMERALS

1 conveying system
2, 3 frame profile
4 motorized conveyor roller
5 belt
6, 7 non-motorized conveyor roller
8, 9 guide rail
10 mounting bracket
11 connection box
12 control
13 photodetector
14 reflector
15 power supply bus
16 —
170 . . . 177 motor controller
18 conveyor controller
19 master conveyor controller
20 central control
21 motor
22 —
23 daisy-chain line
24 communication bus
250 . . . 257 switch

The invention claimed is:

1. A method for addressing control components (170 . . . 177) of a group of multiple linearly interlinked control components (170 . . . 177) of a conveying system (1), comprising the steps
   a) step-by-step addressing of control components (171 . . . 174), which are arranged from any control component (171), but not one lying at the end of the said chain, to a first end of the said chain, by means of a daisy-chain selection line (23), wherein ascending/descending addresses are allocated and/or the sequence of addresses allocated without any order is saved,
   b) step-by-step addressing of the control components (175 . . . 177) from the control component (175), which is arranged adjacent to the control component (171) mentioned in step a) in the direction of the second end of the said chain up to the said second end, by means of the daisy-chain selection line (23), wherein ascending/descending addresses are allocated and/or the sequence of addresses allocated without any order is saved,
   c1) ascending/descending addressing of the control components (171 . . . 174) addressed in step a) in a reverse sequence or
   c2) reversing the sequence saved in step a) and assigning the addresses (171 . . . 177) allocated in step a) to the said reverse sequence and assigning the addresses (171 . . . 177) allocated in step b) to the sequence mentioned in step b).

2. The method as claimed in claim 1, wherein the allocation of an address or reading of an address from a control component (170 . . . 177) is performed via a communication bus (24), to which all of the control components (170 . . . 177) of the group are connected equally.

3. The method as claimed in claim 1, wherein the allocation of an address and/or saving of the sequence of addresses allocated without any order is controlled during the addressing of control components (170 . . . 177) by a superordinate control (18, 19, 20).

4. The method as claimed in claim 1, wherein for the selection of a control component (170 . . . 177) to be currently addressed an intended signal is sent or applied via the daisy-chain selection line (23) to the said control component (170 . . . 177) and the latter is passed on to the adjacent control component (170 . . . 177) after the completion of the addressing process, which control component follows in case a) in the direction of the first end of the said chain and in case b) in the direction of the second end of the said chain.

5. The method as claimed in claim 4, wherein the said signal is passed on by closing a switch (250 . . . 257) interrupting the daisy-chain selection line (23).

6. The method as claimed in claim 4, wherein the said signal is passed on by actively generating the latter.

7. The method as claimed in claim 1, wherein step a) is started by sending/applying a signal for starting an addressing process via a first branch of the daisy-chain selection line (23) interrupted between two control components (170 . . . 177) and step b) by sending/applying a signal for starting an addressing process via the second branch of the daisy-chain selection line (23) interrupted between two control components (170 . . . 177).

8. The method as claimed in claim 7, wherein the said signals are sent/applied by a superordinate control (18, 19, 20) which is connected to the two branches of the daisy-chain selection line (23).

9. The method as claimed in claim 1, wherein the signal for the control component (170 . . . 177) to be currently addressed is sent via the daisy-chain selection line (23) or applied to the latter in the form of a bit sequence, a voltage level, a current level or a change in the level of the voltage and/or current.

10. The method as claimed in claim 1, wherein all of the control components (170 . . . 177) of at least a part of the group are addressed without any order or randomly before step a) with unique addresses for the control components (170 . . . 177).

11. The method as claimed in claim 10, wherein step a) begins at the control component (170 . . . 177) with the lowest/highest address of the said part of the group.

12. The method as claimed in claim 1, wherein step a) begins with a randomly selected control component (170 . . . 177) of said part of the group.

13. A conveying system (1) for transporting conveyed objects, for example containers, comprising a group of multiple control components (170 . . . 177) interlinked linearly by means of a daisy-chain selection line (23) comprising means for the step-by-step addressing of control components (170 . . . 177), which are arranged from any control component (170 . . . 177), but not one lying at the end of the said chain, to a first and a second end of the said chain, by means of the daisy-chain selection line (23), means for allocating ascending/descending addresses to the step-by-step addressed control components (170 . . . 177) and/or for saving a sequence of addresses allocated without any order to the control components (170 . . . 177), means for the ascending/descending addressing of all control components (170 . . . 177) in a first branch in reverse sequence of the addresses assigned in a step-by-step addressing process or for allocating all of the assigned addresses of the first branch to a reversal of the sequence determined in a step-by-step addressing process and a second branch to the sequence determined in a step-by-step addressing process.

14. The conveying system (1) as claimed in claim 13, comprising a superordinate control (18, 19, 20) for controlling the addressing process of the said control components (170 . . . 177).

15. The conveying system (1) as claimed in claim 14, wherein the means for allocating ascending/descending addresses to the step-by-step addressed control components (170 . . . 177) and/or for saving a sequence of addresses allocated without any order to the control components (170 . . . 177), means for the ascending/descending addressing of all of the control components (170 . . . 177) of the group according to their sequence in the said chain by way of the step-by-step addressing process or for allocating all of the allocated addresses to the said sequence are integrated in the superordinate control (18, 19, 20).

16. The conveying system as claimed in claim 14, wherein the daisy-chain selection line (23) between two control components (170 . . . 177) is interrupted and both ends of the latter are connected to the superordinate control (18, 19, 20).

17. The conveying system as claimed in claim 13, comprising a communication bus (24), which connects the control components (170 . . . 177) to one another or to the superordinate control (18, 19, 20).

18. The conveying system as claimed in claim 13, wherein a control component (170 . . . 177) comprises a drive control for a conveyor roller (4) of the conveying system (1).

* * * * *